United States Patent
Mori et al.

(10) Patent No.: US 12,399,030 B2
(45) Date of Patent: Aug. 26, 2025

(54) ESTIMATION METHOD, ESTIMATION APPARATUS AND ESTIMATION PROGRAM OF CAUSE OF LINE OF VEHICLES

(71) Applicant: NIPPON TELEGRAPH AND TELEPHONE CORPORATION, Tokyo (JP)

(72) Inventors: Kohei Mori, Tokyo (JP); Kazuaki Obana, Tokyo (JP); Takahiro Hata, Tokyo (JP); Yuki Yokohata, Tokyo (JP); Aki Hayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 264 days.

(21) Appl. No.: 18/042,397

(22) PCT Filed: Sep. 28, 2020

(86) PCT No.: PCT/JP2020/036560
§ 371 (c)(1),
(2) Date: Feb. 21, 2023

(87) PCT Pub. No.: WO2022/064677
PCT Pub. Date: Mar. 31, 2022

(65) Prior Publication Data
US 2023/0332921 A1    Oct. 19, 2023

(51) Int. Cl.
*G08G 1/01* (2006.01)
*B60W 40/04* (2006.01)
(Continued)

(52) U.S. Cl.
CPC ......... *G01C 21/3841* (2020.08); *B60W 40/04* (2013.01); *G01C 21/3492* (2013.01);
(Continued)

(58) Field of Classification Search
None
See application file for complete search history.

(56) References Cited

U.S. PATENT DOCUMENTS

| 11,195,027 | B2 * | 12/2021 | Vladimerou | ....... G01C 21/3461 |
| 2019/0355245 | A1 * | 11/2019 | Gigengack | ............ B60W 40/04 |
| 2021/0012653 | A1 * | 1/2021 | Yusa | .................... G08G 1/0116 |

FOREIGN PATENT DOCUMENTS

| JP | 2013-020523 | 1/2013 |
| WO | 2020/066656 | 4/2020 |

OTHER PUBLICATIONS

"Kikaigakushu niyoru gazouninshiki wo katsuyoushita koutsueizo kaisekigijyutsu wo kaihatsu (Developing traffic video analysis technology utilizing image recognition by machine learning" [searched on Mar. 16, 2020] (the Internet) (URL: https://pr.fujitsu.com/jp/news/2016/10/18-2.html).

\* cited by examiner

*Primary Examiner* — Todd Melton
(74) *Attorney, Agent, or Firm* — IPUSA, PLLC

(57) ABSTRACT

An estimation method includes acquiring sensor information acquired by a sensor mounted on a first vehicle belonging to a vehicle line, acquiring position information on a location of the first vehicle, and estimating a cause of the vehicle line by using the sensor information and the position information. The estimating of the cause includes estimating the cause by using information on a facility or a feature present near the first vehicle, information indicating a state of the first vehicle, information on an object present ahead of the first vehicle included in the sensor information, or information on a road that affects traveling. The information on the facility or the feature is searched based on the position information, the information on the object is estimated based (Continued)

on the sensor information, and the information on the road is searched based on the position information.

13 Claims, 12 Drawing Sheets

(51) Int. Cl.
*G01C 21/00* (2006.01)
*G01C 21/34* (2006.01)
*G06T 7/20* (2017.01)
*G06V 20/58* (2022.01)

(52) U.S. Cl.
CPC ................ *G06T 7/20* (2013.01); *G06V 20/58* (2022.01); *G08G 1/0112* (2013.01); *G08G 1/0116* (2013.01); *G08G 1/012* (2013.01); *G06T 2207/10016* (2013.01); *G06T 2207/30252* (2013.01)

Fig. 5
(a)
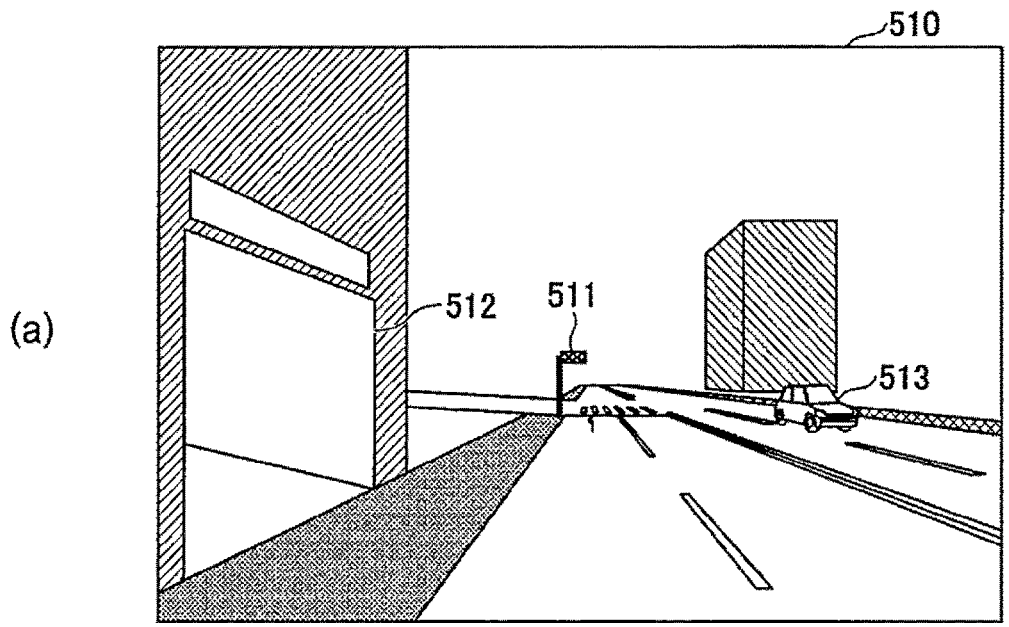
○ POSITION INFORMATION: LATITUDE=$X_1$ DEGREES, LONGITUDE=$Y_1$ DEGREES, ALTITUDE=$Z_1$ DEGREES
○ VEHICLE ATTRIBUTE: HEAD-OF-VEHICLE-LINE VEHICLE
(b)
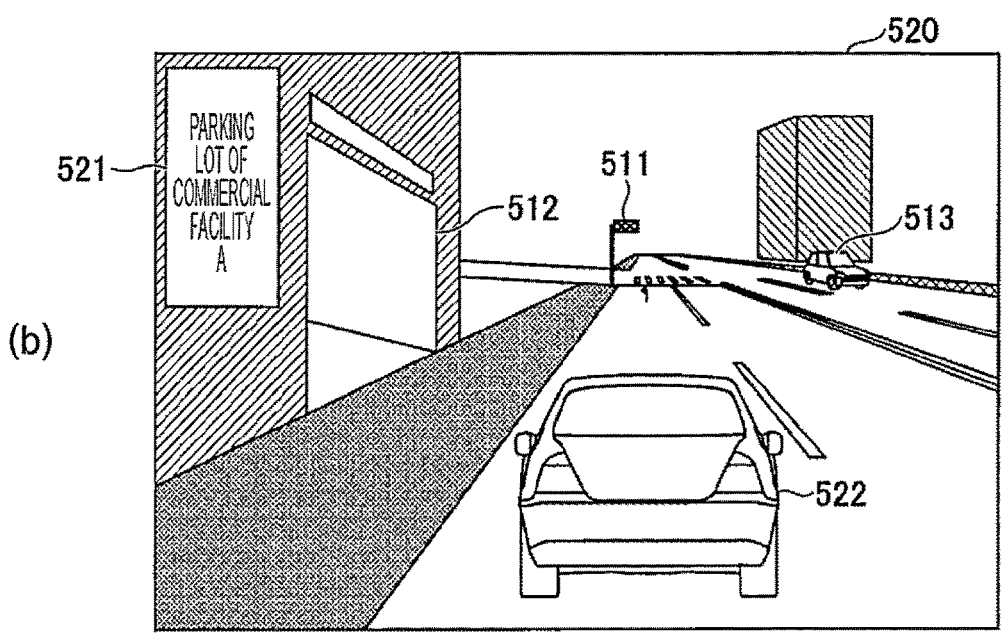
○ POSITION INFORMATION: LATITUDE=$X_2$ DEGREES, LONGITUDE=$Y_2$ DEGREES, ALTITUDE=$Z_2$ DEGREES
○ VEHICLE ATTRIBUTE: NEAR-HEAD-OF-VEHICLE-LINE VEHICLE

Fig. 6
(a) 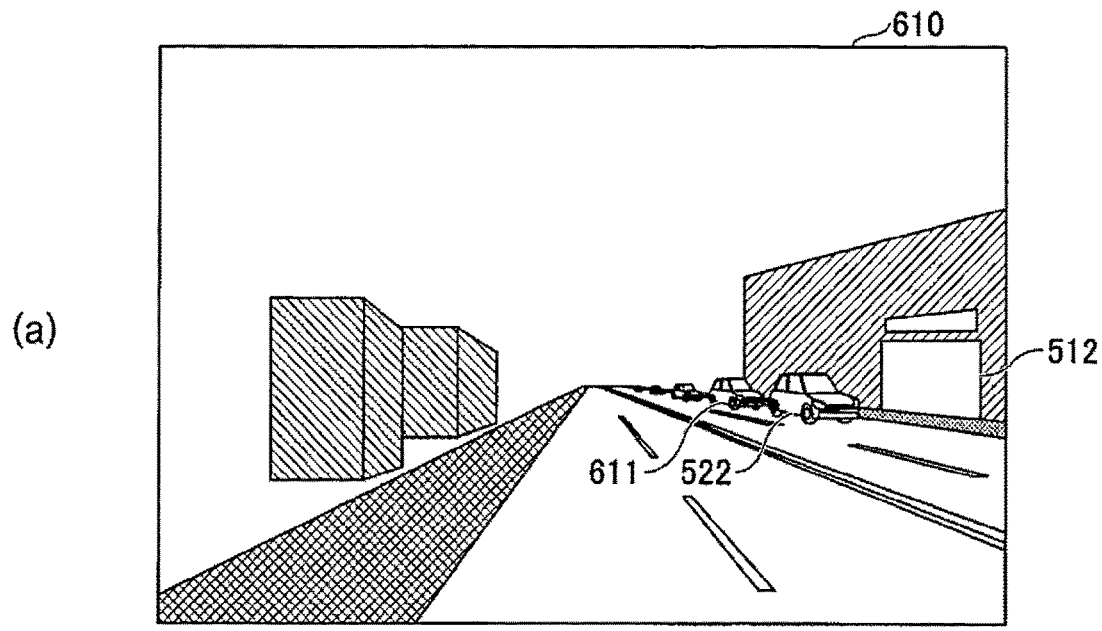
○ POSITION INFORMATION: LATITUDE=$X_3$ DEGREES, LONGITUDE=$Y_3$ DEGREES, ALTITUDE=$Z_3$ DEGREES
○ VEHICLE ATTRIBUTE: ONCOMING VEHICLE
(b) 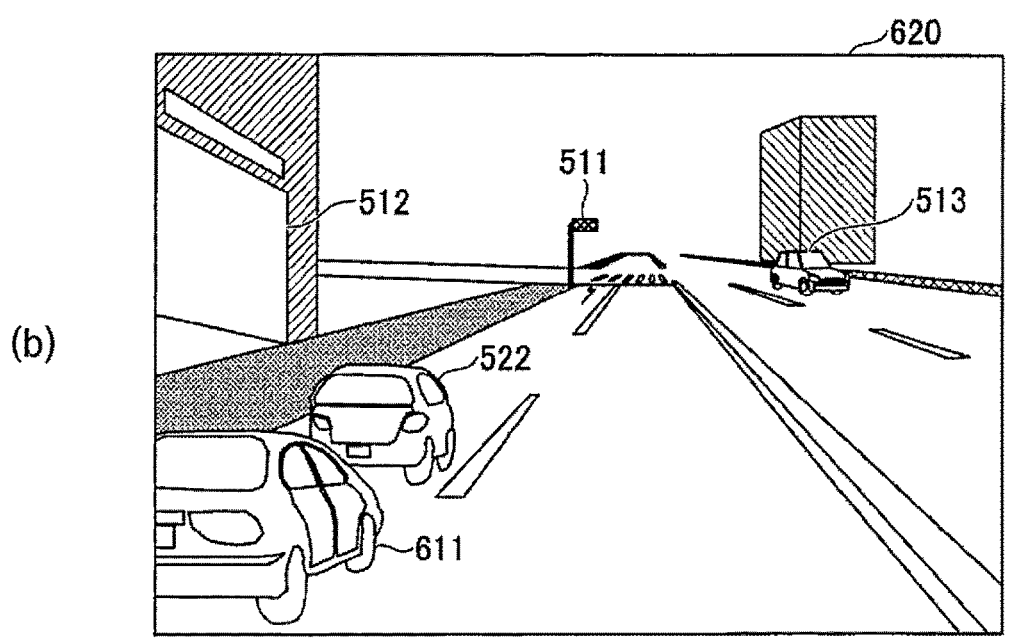
○ POSITION INFORMATION: LATITUDE=$X_4$ DEGREES, LONGITUDE=$Y_4$ DEGREES, ALTITUDE=$Z_4$ DEGREES
○ VEHICLE ATTRIBUTE: OBSERVATION VEHICLE

ESTIMATION METHOD, ESTIMATION APPARATUS AND ESTIMATION PROGRAM OF CAUSE OF LINE OF VEHICLES

TECHNICAL FIELD

The present disclosure relates to an estimation method, an estimation apparatus, and an estimation program.

BACKGROUND ART

There is known a situation recognition technology for detecting occurrence of a vehicle line (i.e., a line of vehicles), such as a traffic congestion, by analyzing a video of a monitoring camera installed on a general road, a highway, or the like and recognizing a road situation (Non Patent Literature 1 and the like below, for example). According to the technology, occurrence of a vehicle line or the like can be detected at low cost in real time.

CITATION LIST

Non Patent Literature

Non Patent Literature 1: "Kikaigakushu niyoru gazoun-inshiki wo katsuyoushita koutsueizo kaisekigijyutsu wo kaihatsu (Developing traffic video analysis technology utilizing image recognition by machine learning" [searched on Mar. 16, 2020] (the Internet) (URL:https://pr.fujitsu.com/jp/news/2016/10/18-2.html)

SUMMARY OF INVENTION

Technical Problem

However, in the case of a fixed monitoring camera, the imaging range is limited depending on the installation position and the imaging direction, and it is only possible to detect occurrence of a vehicle line and the like within the imaging range. Additionally, Non Patent Literature 1 above does not describe estimating the cause of a vehicle line.

In addition, even if it is attempted to estimate the cause of a vehicle line by using the technology described in Non Patent Literature 1 above, it is naturally impossible to estimate the cause of a vehicle line in a case where the cause of the vehicle line exists outside the imaging range of the monitoring camera (e.g., beyond imaging range).

An object of the present disclosure is to estimate the cause of a vehicle line.

Solution to Problem

An estimation method according to one aspect of the present disclosure is an estimation method for estimating a cause of a vehicle line by using a sensor mounted on a vehicle. The estimation method includes:
- a step of acquiring sensor information acquired by a sensor mounted on a first vehicle that is a vehicle belonging to the vehicle line and/or sensor information acquired by a sensor mounted on a second vehicle and also sensing the first vehicle;
- a step of acquiring position information on a location of the first vehicle from which the sensor information is acquired; and
- a step of estimating the cause of the vehicle line by using the sensor information and the position information. The estimating step includes estimating, by using information on a facility or a feature present near the first vehicle searched based on the position information, information indicating a state of the first vehicle estimated based on the sensor information, information on an object present ahead of the first vehicle included in the sensor information, or information on a road that affects traveling searched based on the position information.

Advantageous Effects of Invention

According to the present disclosure, it is possible to estimate the cause of a vehicle line.

BRIEF DESCRIPTION OF DRAWINGS

FIG. 5 is a first diagram illustrating one example of position information and video information.

FIG. 6 is a second diagram illustrating one example of the position information and the video information.

DESCRIPTION OF EMBODIMENTS

Figure 1:
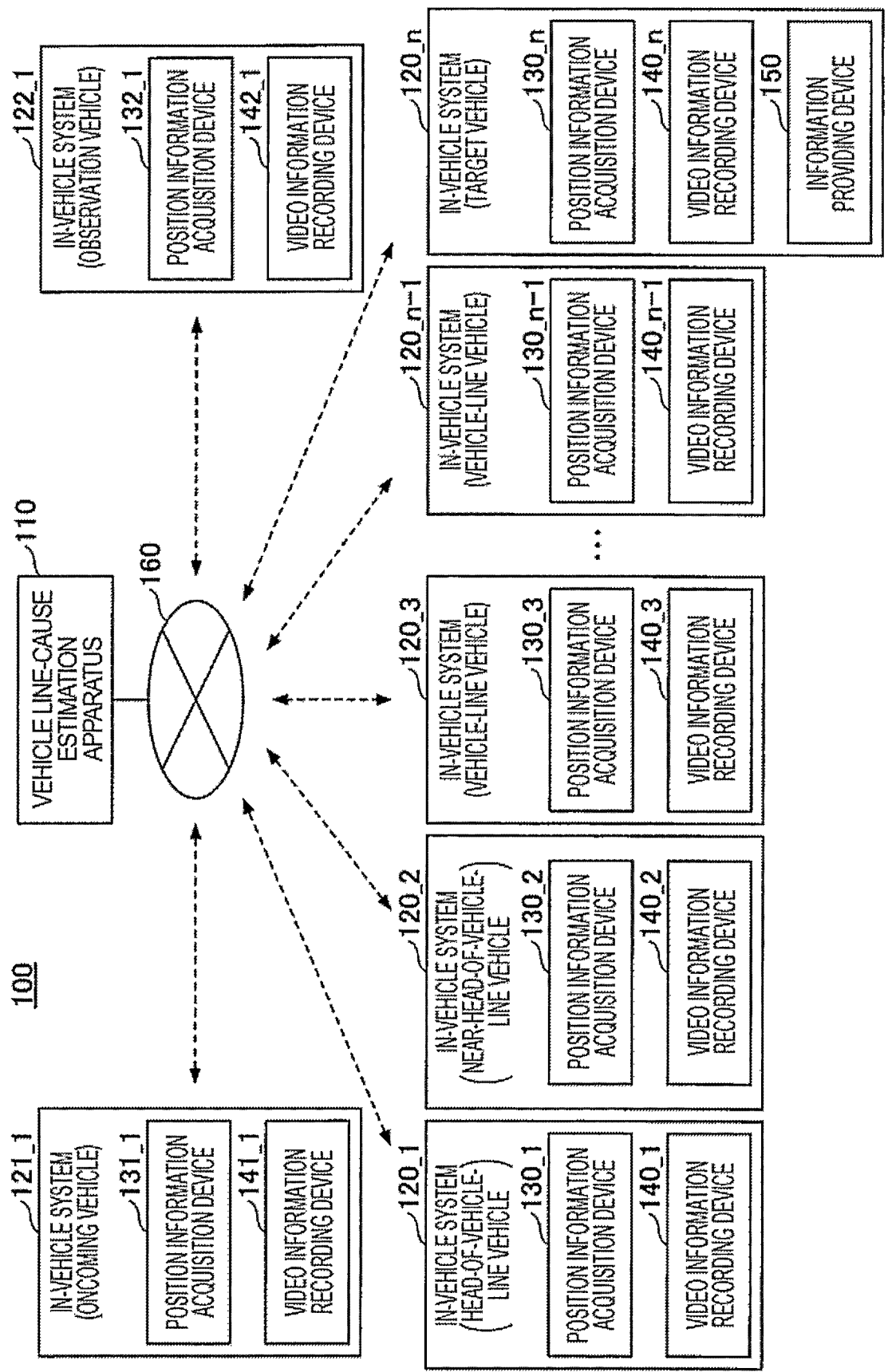
FIG. 1 is a diagram illustrating one example of a system configuration of an information providing system.

Hereinafter, embodiments will be described with reference to the drawings. Note that in the present specification and the drawings, components having substantially the same functional configuration are denoted by the same reference numerals, and redundant description is omitted.

First Embodiment

<System Configuration of Information Providing System>

First, a system configuration of an entire information providing system including an information providing device according to a first embodiment will be described. FIG. 1 is a diagram illustrating one example of a system configuration of the information providing system. As illustrated in FIG. 1, an information providing system 100 includes a vehicle line-cause estimation apparatus 110, an in-vehicle system 120_1 to 120_n, an in-vehicle system 121_1, and an in-vehicle system 122_1. The vehicle line-cause estimation apparatus 110 and each in-vehicle system 120_1 to 122_1 are communicably connected via a network 160.

The vehicle line-cause estimation apparatus 110 detects occurrence of a vehicle line using a known method. Note that a vehicle line refers to a state in which two or more vehicles are lined up, and includes, in addition to what is called traffic congestion, states having various causes, such as a state in which vehicles are lined up at a traffic light to make a right turn or left turn, a state in which vehicles are parked in a line, a state in which vehicles are lined up to enter a facility, and the like. Additionally, each vehicle belonging to a vehicle line does not need to be stopped (at speed of 0 km/h), and may be in a state of traveling at a speed lower than a value predetermined relative to a speed of a vehicle not belonging to the vehicle line.

Additionally, when detecting occurrence of a vehicle line, the vehicle line-cause estimation apparatus 110 determines the occurrence position of the vehicle line, and acquires position information and video information from each vehicle at the determined occurrence position (and periphery of the vehicle line) by communicating with an in-vehicle system mounted on each vehicle. Note that an occurrence position of a vehicle line may be an occurrence region.

Note that the vehicle from which the position information and the video information are acquired when the vehicle line-cause estimation apparatus 110 detects occurrence of a vehicle line includes, for example, a vehicle positioned at the head of the vehicle line (a head-of-vehicle-line vehicle);
  a vehicle positioned at the second or third from the head of the vehicle line (a near-head-of-vehicle-line vehicle);
  another vehicle belonging to the vehicle line (a vehicle-line vehicle);
  a vehicle that travels in an opposite lane opposite to a lane in which the vehicle line has occurred (an oncoming vehicle);
  a vehicle that travels in a lane adjacent to a lane in which the vehicle line has occurred (an observation vehicle);
  and the like. Note that the vehicle-line vehicle is included in the above vehicles for the following reason, for example. That is, in a case where there are a plurality of causes of a vehicle line, the plurality of causes can be estimated by using the position information and the video information acquired from the vehicle-line vehicle, in addition to the position information and the video information acquired from the head-of-vehicle-line vehicle, the near-head-of-vehicle-line vehicle, and the like. Additionally, in a case where the vehicle itself is the cause of the vehicle line, it is conceivable to acquire and use the video information captured by a vehicle that can image the vehicle that is the cause, such as the above-described vehicle-line vehicle, oncoming vehicle, and the like.

Additionally, the vehicle line-cause estimation apparatus 110 estimates the cause of a vehicle line in the traveling direction of a target vehicle on the basis of the position information and the video information acquired from each vehicle, and transmits the estimation result to the in-vehicle system 120_n of the target vehicle.

The in-vehicle systems 120_1 to 120_n–1, 121_1, and 122_1 are systems mounted on the head-of-vehicle-line vehicle, the near-head-of-vehicle-line vehicle, the vehicle-line vehicle, the oncoming vehicle, and the observation vehicle. The in-vehicle systems 120_1 to 120_n–1, 121_1, and 122_1 include position information acquisition devices 130_1 to 130_n–1, 131_1, and 132_1; and video information recording devices 140_1 to 140_n–1, 141_1, and 142_1, respectively.

Note that regardless of the attribute of the vehicle (the head-of-vehicle-line vehicle, the near-head-of-vehicle-line vehicle, the vehicle-line vehicle, the oncoming vehicle, or the observation vehicle), all the in-vehicle systems have the position information acquisition device and the video information recording device because the attribute of the vehicle changes over time. This is because, for example, the vehicle-line vehicle changes to the near-head-of-vehicle-line vehicle or the head-of-vehicle-line vehicle, and the target vehicle changes to the observation vehicle over time.

The position information acquisition devices 130_1 to 130_n–1, 131_1, and 132_1 acquire the current position information on respective vehicles by a global positioning system (GPS), for example. Additionally, the position information acquisition devices 130_1 to 130_n–1, 131_1, and 132_1 transmit the acquired position information to the vehicle line-cause estimation apparatus 110.

The video information recording devices 140_1 to 140_n–1, 141_1, and 142_1 are examples of sensor information recording devices, and are, for example, in-vehicle video recording devices, each of which is attached to a windshield, a dashboard, or the like of a vehicle. The video information recording devices 140_1 to 140_n–1, 141_1, and 142_1 record the current outside states of respective vehicles as videos, and transmit the recorded video information to the vehicle line-cause estimation apparatus 110.

Note that while the present embodiment describes a case where the video information recording device is used as a device for recording a state outside the vehicle, a sensor information recording device other than the video information recording device may be used instead of the video information recording device or in addition to the video information recording device. Examples of the sensor information recording device other than the video information recording device includes a laser imaging detection and ranging (LiDAR) information recording device and the like.

The in-vehicle system 120_n is a system mounted on the target vehicle. The in-vehicle system 120_n includes an information providing device 150 in addition to the position information acquisition device 130_n and the video information recording device 140_n.

The information providing device 150 acquires an estimation result of the cause of a vehicle line from the vehicle line-cause estimation apparatus 110 when the vehicle line occurs, and provides the estimation result (or an instruction according to the estimation result) to an occupant or the like of the target vehicle. As a result, a driver of the target vehicle can perform an appropriate driving operation according to the estimation result of the cause of the vehicle line.

The appropriate driving operation according to the estimation result of the cause of the vehicle line refers to, for example, a driving operation performed so as to travel along a detour route after having determined, based on the estimation result of the cause of the vehicle line, that the vehicle line will continue for a certain period of time or more. Additionally, the appropriate driving operation according to the estimation result of the cause of the vehicle line refers to, a driving operation performed so as to travel by following the vehicle line as is, after having determined, based on the estimation result of the cause of the vehicle line, that the vehicle line will dissipate in less than a predetermined period of time.

Alternatively, the appropriate driving operation according to the estimation result of the cause of the vehicle line refers to a driving operation performed so as to change to the adjacent lane and travel after having determined, based on the estimation result of the cause of the vehicle line, that there is no vehicle line ahead in the adjacent lane. Additionally, the appropriate driving operation according to the estimation result of the cause of the vehicle line refers to a driving operation performed so as to travel by following the vehicle line as is, after having determined, based on the estimation result of the cause of the vehicle line, that there is a vehicle line ahead in the adjacent lane as well.

Note that in a case where the target vehicle is traveling along a route guided by a navigation device, for example, the information providing device 150 may provide the estimation result (or the instruction according to the estimation result) to the navigation device. As a result, the navigation device can provide route guidance on the basis of the estimation result (or the instruction according to the estimation result), and the driver of the target vehicle can perform an appropriate driving operation according to the estimation result of the cause of the vehicle line.

Additionally, in a case where the target vehicle has an automatic driving function and is in an automatic driving mode, for example, the information providing device 150 may provide the estimation result (or the instruction according to the estimation result) to the automatic driving function. As a result, in the automatic driving function, it is possible to perform an appropriate driving operation (automatic driving) according to the estimation result of the cause of the vehicle line.

<Application Example of Information Providing System>

Figure 2:
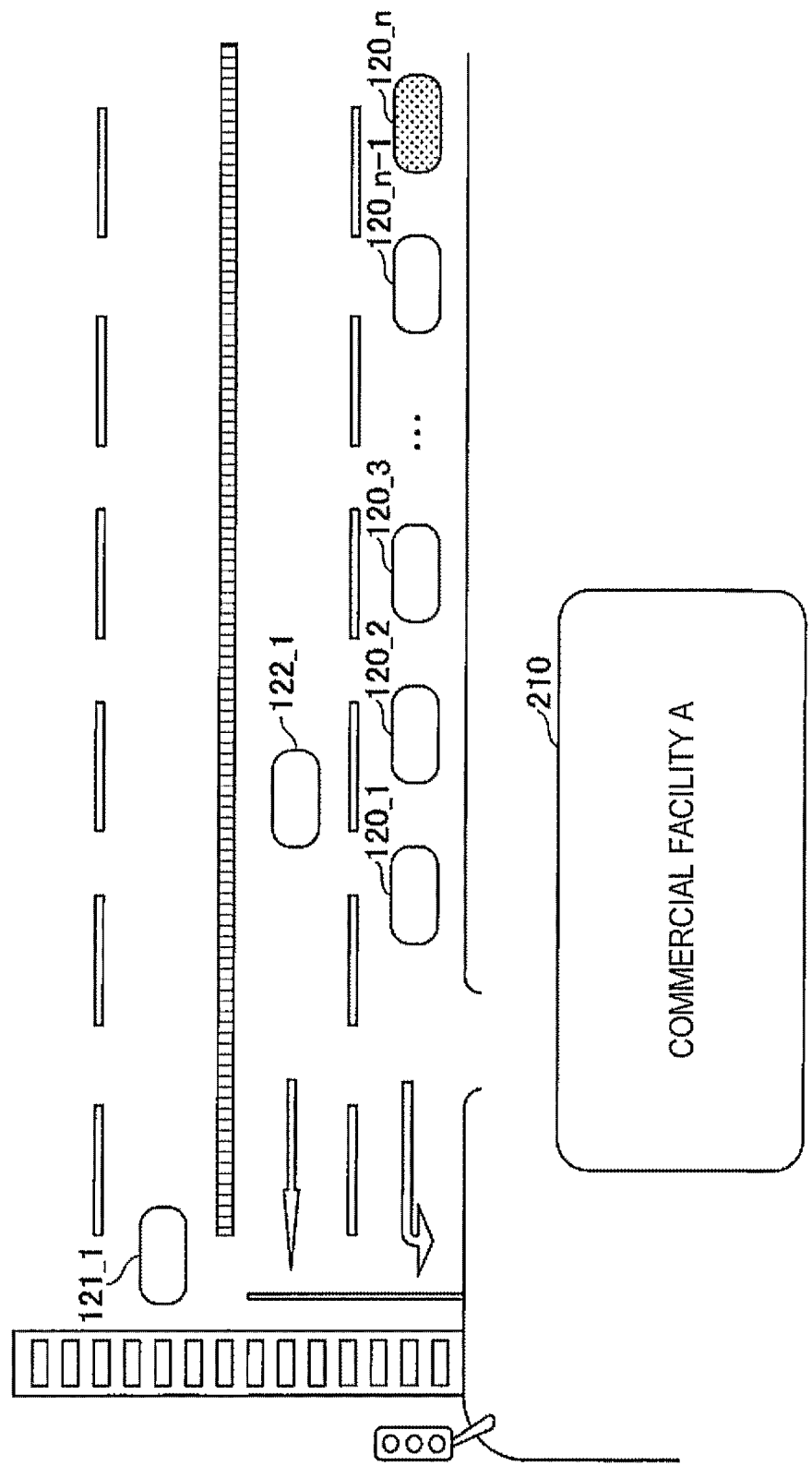
FIG. 2 is a diagram illustrating an application example of the information providing system.

Next, an application example of the information providing system 100 will be described. FIG. 2 is a diagram illustrating an application example of the information providing system. The example of FIG. 2 illustrates a situation where there is a facility 210 (a "commercial facility A") along a two-lane road;
 an entrance of a parking lot of the facility 210 faces (is adjacent to) the two-lane road;
 a traffic light is installed ahead of the entrance of the parking lot of the facility 210;
 the left lane of the two-lane road is designated as a left-turn lane before the traffic light; and
 in the left lane of the two-lane road, a line of vehicles waiting for entry into the parking lot has occurred from the vicinity of the entrance of the parking lot of the facility 210.

In such a road situation, it is assumed that the target vehicle on which the in-vehicle system 120_n is mounted is lined up at the end of the vehicle line to turn left at the traffic light and head for the destination. In such a case, in the information providing system 100, the vehicle line-cause estimation apparatus 110 estimates that the cause of the vehicle line in the traveling direction of the target vehicle is waiting for entry into the parking lot of the facility 210 on the basis of the position information and the video information acquired from the in-vehicle system 120_1 of the head-of-vehicle-line vehicle;
 the in-vehicle system 120_2 of the near-head-of-vehicle-line vehicle;
 the in-vehicle system 121_1 of the oncoming vehicle; and
 the in-vehicle system 122_1 of the observation vehicle, and transmits the estimation result to the in-vehicle system 120_n of the target vehicle.

As a result, for example, the driver of the target vehicle determines that there is no vehicle line ahead in the adjacent lane, and changes to the adjacent right lane. Additionally, after passing the vicinity of the entrance of the parking lot of the facility 210, the driver of the target vehicle changes to the left lane and turns left at the intersection where the traffic light is located.

As described above, the information providing system 100 can acquire information in a wider range by using the information (the position information and the video information) acquired by the in-vehicle systems. Therefore, according to the information providing system 100, it is possible to estimate the cause of a vehicle line, which cannot be estimated by a fixed monitoring camera, and provide the estimation result. As a result, it is possible to determine whether a vehicle line will continue for a certain period of time or more at the time of the occurrence of the vehicle line, or determine whether a vehicle line is also occurring ahead in the adjacent lane. Thus, it is possible to perform an appropriate driving operation.

<Hardware Configuration of Vehicle Line-Cause Estimation Apparatus>

Figure 3:
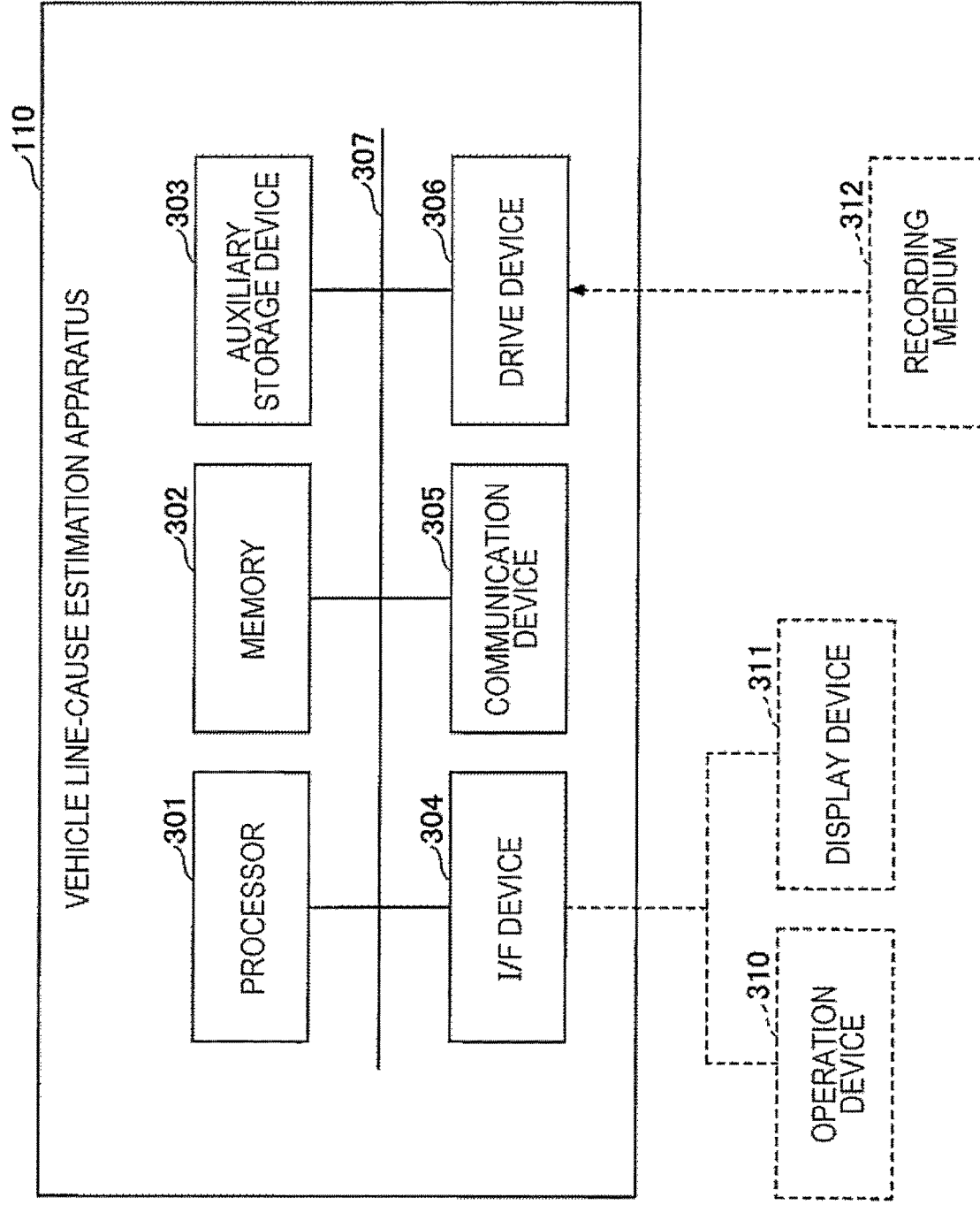
FIG. 3 is a diagram illustrating one example of a hardware configuration of a vehicle line-cause estimation apparatus.

Next, a hardware configuration of the vehicle line-cause estimation apparatus 110 will be described. FIG. 3 is a diagram illustrating one example of the hardware configuration of the vehicle line-cause estimation apparatus. As illustrated in FIG. 3, the vehicle line-cause estimation apparatus 110 includes a processor 301, a memory 302, an auxiliary storage device 303, an interface (I/F) device 304, a communication device 305, and a drive device 306. Note that the pieces of hardware of the vehicle line-cause estimation apparatus 110 are connected to each other via a bus 307.

The processor 301 is, for example, an arithmetic device of various types such as a central processing unit (CPU) and a graphics processing unit (GPU). The processor 301 reads and executes various programs (e.g., a vehicle line-cause estimation program and the like described later) on the memory 302.

The memory 302 includes a main storage device such as a read only memory (ROM) and a random access memory (RAM). The processor 301 and the memory 302 form what is called a computer, and the processor 301 executes various programs read on the memory 302, so that the computer implements various functions.

The auxiliary storage device 303 stores various programs and various data used when the various programs are executed by the processor 301. For example, a feature data storage unit 421 and a structure data storage unit 422 to be described later are implemented in the auxiliary storage device 303.

The I/F device 304 is a connection device that connects an operation device 310 and a display device 311, which are examples of external devices, to the vehicle line-cause estimation apparatus 110. The I/F device 304 accepts an operation on the vehicle line-cause estimation apparatus 110 via the operation device 310. Additionally, the I/F device 304 outputs a result of processing of the vehicle line-cause estimation apparatus 110 and displays the result on the display device 311.

The communication device 305 is a communication device for communicating with the in-vehicle system via the network 160.

The drive device 306 is a device into which a recording medium 312 is to be set. The recording medium 312 here includes a medium that optically, electrically, or magnetically records information, such as a CD-ROM, a flexible disk, or a magneto-optical disk. Additionally, the recording medium 312 may include a semiconductor memory or the like that electrically records information, such as a ROM or a flash memory.

Note that the various programs installed in the auxiliary storage device 303 are installed, for example, by setting the distributed recording medium 312 in the drive device 306 and reading various programs recorded in the recording medium 312 by the drive device 306. Alternatively, various programs installed in the auxiliary storage device 303 may be installed by being downloaded from a network via the communication device 305.

Additionally, while FIG. 3 describes the hardware configuration of the vehicle line-cause estimation apparatus 110, it is assumed that each device (e.g., the information providing device 150 of in-vehicle system 120_n mounted on the target vehicle) of the in-vehicle system mounted on each vehicle has substantially the same hardware configuration.

<Functional Configuration of Vehicle Line-Cause Estimation Apparatus>

Figure 4:
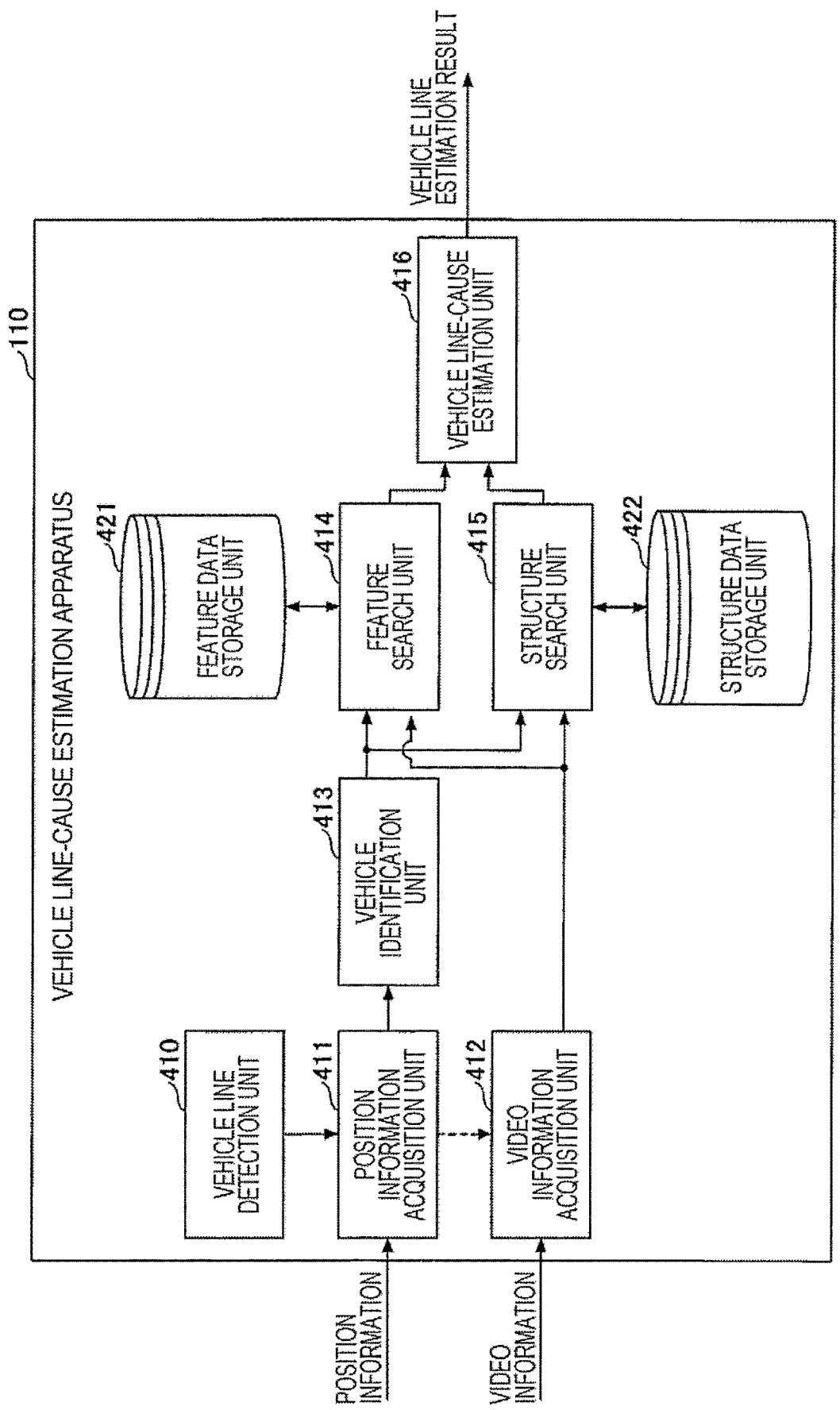
FIG. 4 is a diagram illustrating one example of a functional configuration of the vehicle line-cause estimation apparatus.

Next, a functional configuration of the vehicle line-cause estimation apparatus 110 will be described. FIG. 4 is a diagram illustrating one example of the functional configuration of the vehicle line-cause estimation apparatus. As described above, the vehicle line-cause estimation program is installed in the vehicle line-cause estimation apparatus 110, and when the program is executed, the vehicle line-cause estimation apparatus 110 functions as:

a vehicle line detection unit 410;
a position information acquisition unit 411;
a video information acquisition unit 412 (one example of a sensor information acquisition unit);
a vehicle identification unit 413;
a feature search unit 414;
a structure search unit 415; and
a vehicle line-cause estimation unit 416 (one example of an estimation unit).

The vehicle line detection unit 410 detects occurrence of a vehicle line in the vicinity of the target vehicle by using a known method. When detecting occurrence of a vehicle line, the vehicle line detection unit 410 determines the occurrence position of the vehicle line, and notifies the position information acquisition unit 411 and the video information acquisition unit 412 of the determined occurrence position.

The position information acquisition unit 411 acquires the position information from each vehicle at the occurrence position (and its periphery) notified by the vehicle line detection unit 410, by communicating with the in-vehicle system mounted on each vehicle, and notifies the vehicle identification unit 413 of the position information.

The video information acquisition unit 412 acquires the video information from each vehicle at the occurrence position (and its periphery) notified by the vehicle line detection unit 410, by communicating with the in-vehicle system mounted on each vehicle, and notifies the feature search unit 414 and the structure search unit 415 of the video information.

Note that while it has been described herein that the vehicle that detects the occurrence of the vehicle line and the vehicle that acquires the position information and the video information for estimating the cause of the vehicle line are different vehicles, these may be the same vehicle. That is, the vehicle line detection unit 410 may be configured to detect the occurrence of the vehicle line from the position information and the video information acquired from each vehicle.

When the position information on each vehicle is notified by the position information acquisition unit 411, the vehicle identification unit 413 determines the attribute (the head-of-vehicle-line vehicle, the near-head-of-vehicle-line vehicle, the oncoming vehicle, or the observation vehicle) of each vehicle and notifies the feature search unit 414 and the structure search unit 415 of the attribute together with the position information. The feature search unit 414 searches the feature data storage unit 421 for corresponding feature data (feature data within a predetermined distance) on the basis of the attribute of each vehicle and the position information on each vehicle notified by the vehicle identification unit 413, and the video information notified by the video information acquisition unit 412. Additionally, the feature search unit 414 notifies the vehicle line-cause estimation unit 416 of the search result of the feature data.

Note that the feature data stored in the feature data storage unit 421 includes:
(a) data related to a traveling rule at the time of traveling on a road, such as an intersection, a traffic light, and a road sign;
(b) facility information, such as
data related to the entrance (an entrance facing a road) of a parking lot of a sightseeing spot or a commercial facility,
data related to a toll booth,
data related to a station of public transportation such as a bus stop, a taxi station, a train station, and the like;
(c) feature information (information on a feature being present on a road), such as
data related to disaster (a landslide),
data related to temporary lane closure (construction, a low-speed vehicle (a mobile sales vehicle, an advertising vehicle, an election campaign vehicle, and the like));
and the like. Note that the data related to the traveling rule may include a rule defined by law or a de facto rule shared among users.

The structure search unit 415 searches the structure data storage unit 422 for corresponding structure data on the basis of the attribute of each vehicle and the position information on each vehicle notified by the vehicle identification unit 413 and video information notified by the video information acquisition unit 412. Additionally, the structure search unit 415 notifies the vehicle line-cause estimation unit 416 of the search result of the structure data.

Note that the structure data stored in the structure data storage unit 422 includes:
(d) road information that affects driving, such as
data related to a change in altitude of a surrounding road and a change in the number of lanes,
data related to a connection part between road links,
data related to a sag part and a merging part, and the like.

The vehicle line-cause estimation unit 416 estimates the cause of the vehicle line on the basis of the search result of the feature data notified by the feature search unit 414 and the search result of the structure data notified by the structure search unit 415.

In addition, the vehicle line-cause estimation unit 416 directly estimates the cause of the vehicle line on the basis of the video information acquired by the video information acquisition unit 412.

For example, the vehicle line-cause estimation unit 416 calculates the speed of the head-of-vehicle-line vehicle on the basis of the video information acquired from the head-of-vehicle-line vehicle, and estimates that the head-of-vehicle-line vehicle is the cause of the vehicle line when the head-of-vehicle-line vehicle is traveling at a speed lower than a value predetermined relative to a speed of the target vehicle.

Additionally, in the video information acquired from the head-of-vehicle-line vehicle, the vehicle line-cause estimation unit 416 estimates that an object (an obstacle such as an accident vehicle, a failure vehicle, or a fallen object) being temporarily present (i.e., being not present in normal times) ahead on the road on which the head-of-vehicle-line vehicle travels is the cause of the vehicle line.

The vehicle line-cause estimation unit 416 transmits the estimation result of the cause of the vehicle line to the in-vehicle system 120_n of the target vehicle.

Note that in a case where a plurality of search results of feature data and search results of structure data are notified, the vehicle line-cause estimation unit 416 estimates the cause of the vehicle line by assigning priority among pieces of feature data, among pieces of structure data, or between feature data and structure data.

Additionally, in a case where there is no search result of feature data and no search result of structure data, the vehicle line-cause estimation unit 416 transmits an estimation result that this is a vehicle line with an unknown cause or with no particular cause to the in-vehicle system 120_n of the target vehicle.

The vehicle line with no particular cause refers to a vehicle line in a case where there is no feature or structure to be a cause in the vicinity of the vehicle line, such as a vehicle line caused by a vehicle (e.g., a commercial vehicle as represented by a transport vehicle, a taxi, or the like) that has stopped for a break for the driver, or a vehicle line caused by a vehicle that has stopped for waiting for entry into a facility in a distant place. Note that the state of the vehicle line with no particular cause may be estimated as "a parked vehicle", and this result may be transmitted to the in-vehicle system 120_n of the target vehicle. Additionally, in a case where a cause is to be estimated for the vehicle line based on a vehicle stopped for a break, time may also be taken into consideration. For example, at lunch time or a similar time, a flag for estimating that a vehicle stopped for a break is the cause of the vehicle line may be turned on.

<Specific Examples of Position Information and Video Information>

Next, specific examples of the position information and the video information will be described. FIGS. 5 and 6 are first and second diagrams illustrating one example of the position information and the video information.

FIG. 5(a) illustrates video information 510 of a vehicle whose vehicle attribute is determined to be the head-of-vehicle-line vehicle on the basis of position information (latitude=$X_1$ degrees, longitude=$Y_1$ degrees, altitude=$Z_1$ degrees). According to the video information 510, it is possible to grasp that:
  there is a traffic light 511 ahead;
  there is no vehicle between the head-of-vehicle-line vehicle and the traffic light 511;
  the head-of-vehicle-line vehicle is stopped before an entrance 512 of a parking lot;
  an oncoming vehicle 513 is traveling;
  and the like.

FIG. 5(b) illustrates video information 520 of a vehicle whose vehicle attribute is determined to be the near-head-of-vehicle-line vehicle on the basis of position information (latitude=$X_2$ degrees, longitude=$Y_2$ degrees, altitude=$Z_2$ degrees). According to the video information 520, in addition to the information that can be grasped from the video information 510, it is possible to grasp that
  a head-of-vehicle-line vehicle 522 is stopped before the entrance 512 of the parking lot of the "commercial facility A",
  and the like.

FIG. 6(a) illustrates video information 610 of a vehicle whose vehicle attribute is determined to be the oncoming vehicle on the basis of position information (latitude=$X_3$ degrees, longitude=$Y_3$ degrees, altitude=$Z_3$ degrees). According to the video information 610, it is possible to grasp that
  the head-of-vehicle-line vehicle 522 is stopped at the head of the vehicle line before the entrance 512 of the parking lot;
  a near-head-of-vehicle-line vehicle 611 is stopped in the second position in the vehicle line before the entrance 512 of the parking lot;
  and the like.

FIG. 6(b) illustrates video information 620 of a vehicle whose vehicle attribute is determined to be the observation vehicle on the basis of position information (latitude=$X_4$ degrees, longitude=$Y_4$ degrees, altitude=$Z_4$ degrees). According to the video information 620, in addition to the information that can be grasped from the video information 610, it is possible to grasp that
  there is no vehicle line ahead in the right lane adjacent to the left lane where the vehicle line is occurring,
  and the like.

<Flow of Vehicle Line-Cause Estimation Processing>

Figure 7:
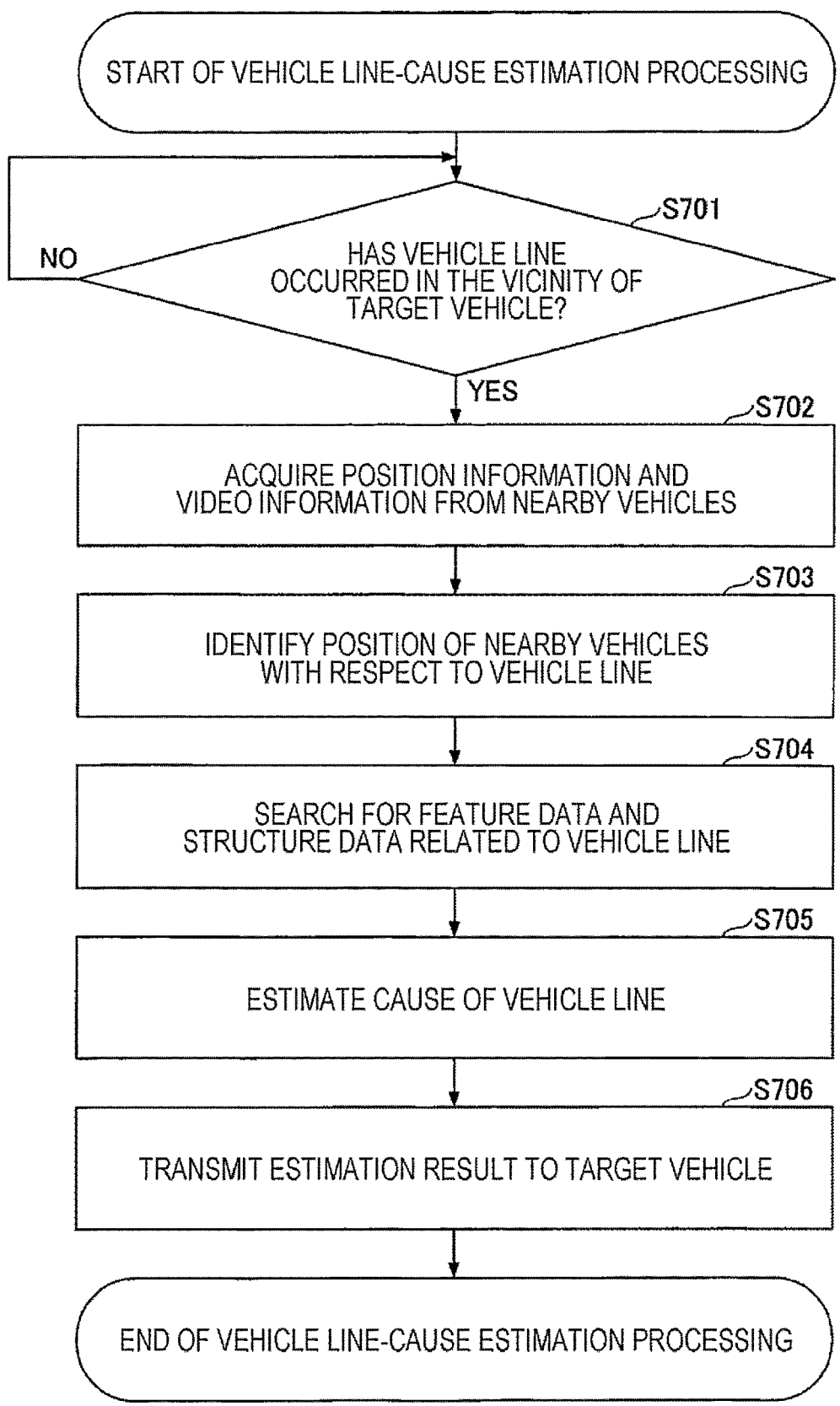
FIG. 7 is a flowchart illustrating a flow of vehicle line-cause estimation processing.

Next, a flow of vehicle line-cause estimation processing by the vehicle line-cause estimation apparatus 110 will be described. FIG. 7 is a flowchart illustrating a flow of the vehicle line-cause estimation processing.

In step S701, the vehicle line detection unit 410 of the vehicle line-cause estimation apparatus 110 determines whether a vehicle line has occurred in the vicinity of the target vehicle. If it is determined in step S701 that no vehicle line has occurred (NO in step S701), the processing waits until it is determined that a vehicle line has occurred.

With respect to the above, if it is determined in step S701 that a vehicle line has occurred (YES in step S701), the processing proceeds to step S702. In step S702, the position information acquisition unit 411 and the video information acquisition unit 412 of the vehicle line-cause estimation apparatus 110 acquire the position information and the video information from each vehicle at the occurrence position (and its periphery) of the vehicle line.

In step S703, the vehicle identification unit 413 of the vehicle line-cause estimation apparatus 110 identifies a position with respect to the vehicle line on the basis of the position information on each vehicle, and determines the attribute of each vehicle.

In step S704, the feature search unit 414 and the structure search unit 415 of the vehicle line-cause estimation apparatus 110 search for feature data and structure data related to the vehicle line on the basis of the attribute of each vehicle, the position information on each vehicle, and the video information of each vehicle.

In step S705, the vehicle line-cause estimation unit 416 of the vehicle line-cause estimation apparatus 110 estimates the cause of the vehicle line in the traveling direction of the target vehicle on the basis of the search results of the feature data and the structure data. Note that in a case where the vehicle that detects the occurrence of the vehicle line and the vehicle that acquires the position information and the video information for estimating the cause of the vehicle line are the same vehicle, the method for estimating the cause of the vehicle line is not limited to this. For example, on the basis of the position information and the video information from the vehicle that detects the occurrence of the vehicle line, estimation may be performed by referring to information related to causes of vehicle lines that occurred in the past at various places across the country stored in advance (i.e., without searching for the feature data and the structure data).

In step 3706, the vehicle line-cause estimation unit 416 of the vehicle line-cause estimation apparatus 110 transmits the estimation result to the in-vehicle system of the target vehicle.

Note that in addition to the estimation result, the vehicle line-cause estimation unit 416 of the vehicle line-cause estimation apparatus 110 may also transmit information that can be grasped from the video information 510, 520, 610, and 620 to the in-vehicle system of the target vehicle.

<Functional Configuration of In-Vehicle System of Target Vehicle>

Figure 8:
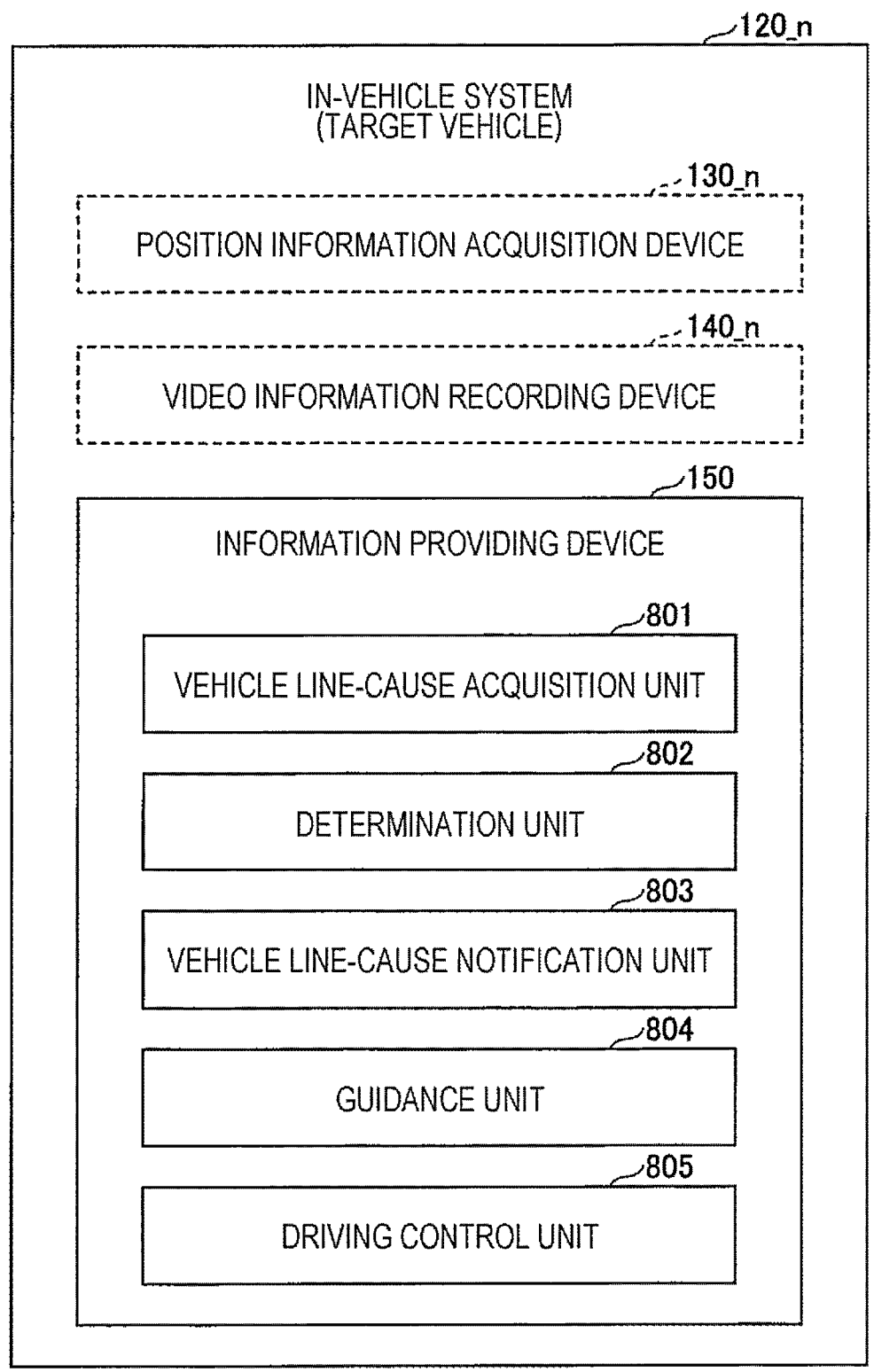
FIG. 8 is a diagram illustrating one example of a functional configuration of an in-vehicle system of a target vehicle.

Next, a functional configuration of the in-vehicle system 120_n of the target vehicle will be described. FIG. 8 is a diagram illustrating one example of the functional configuration of the in-vehicle system of the target vehicle. As described above, the in-vehicle system 120_n includes the position information acquisition device 130_n, the video information recording device 140_n, and the information providing device 150. Among them, the information providing device 150 will be described in detail below.

An information providing program is installed in the information providing device 150, and when the program is executed, the information providing device 150 functions as a vehicle line-cause acquisition unit 801, a determination unit 802, a vehicle line-cause notification unit 803, a guidance unit 804, and a driving control unit 805.

When a vehicle line occurs, the vehicle line-cause acquisition unit 801 acquires an estimation result of the cause of the vehicle line from the vehicle line-cause estimation apparatus 110.

The determination unit 802 performs various determinations on the basis of the acquired estimation result of the cause of the vehicle line, and notifies the vehicle line-cause notification unit 803 of the determination results. The various determination results here include, for example, a result of determination as to whether the vehicle line will continue for a certain period of time or longer (whether the vehicle line will dissipate within a certain period of time) based on the estimation result of the cause of the vehicle line. Alternatively, the various determination results here may include a result of determination as to whether the vehicle line is occurring ahead in the adjacent lane based on the estimation result of the cause of the vehicle line.

Note that the determination unit 802 may acquire information that can be grasped from the video information 510, 520, 610, and 620 together with the estimation result of the cause of the vehicle line when making various determinations.

The vehicle line-cause notification unit 803 is one example of an instruction unit. When the estimation result of the cause of the vehicle line is acquired by the vehicle line-cause acquisition unit 801, the vehicle line-cause notification unit 803 provides the acquired estimation result of the cause of the vehicle line to an occupant of the target vehicle. Additionally, when the determination unit 802 makes various determinations, the vehicle line-cause notification unit 803 provides an instruction (e.g., an instruction regarding which lane to travel) according to the estimation result. As a result, the driver of the target vehicle can perform an appropriate driving operation according to the estimation result of the vehicle line.

When the target vehicle is traveling along a route guided by the navigation device, the guidance unit 804 provides the acquired estimation result of the cause of the vehicle line (or the instruction according to the estimation result) to the navigation device.

When the target vehicle has an automatic driving function and is in an automatic driving mode, the driving control unit 805 provides the acquired estimation result of the cause of the vehicle line (or the instruction according to the estimation result) to the automatic driving function.

<Flow of Information Providing Processing>

Figure 9:
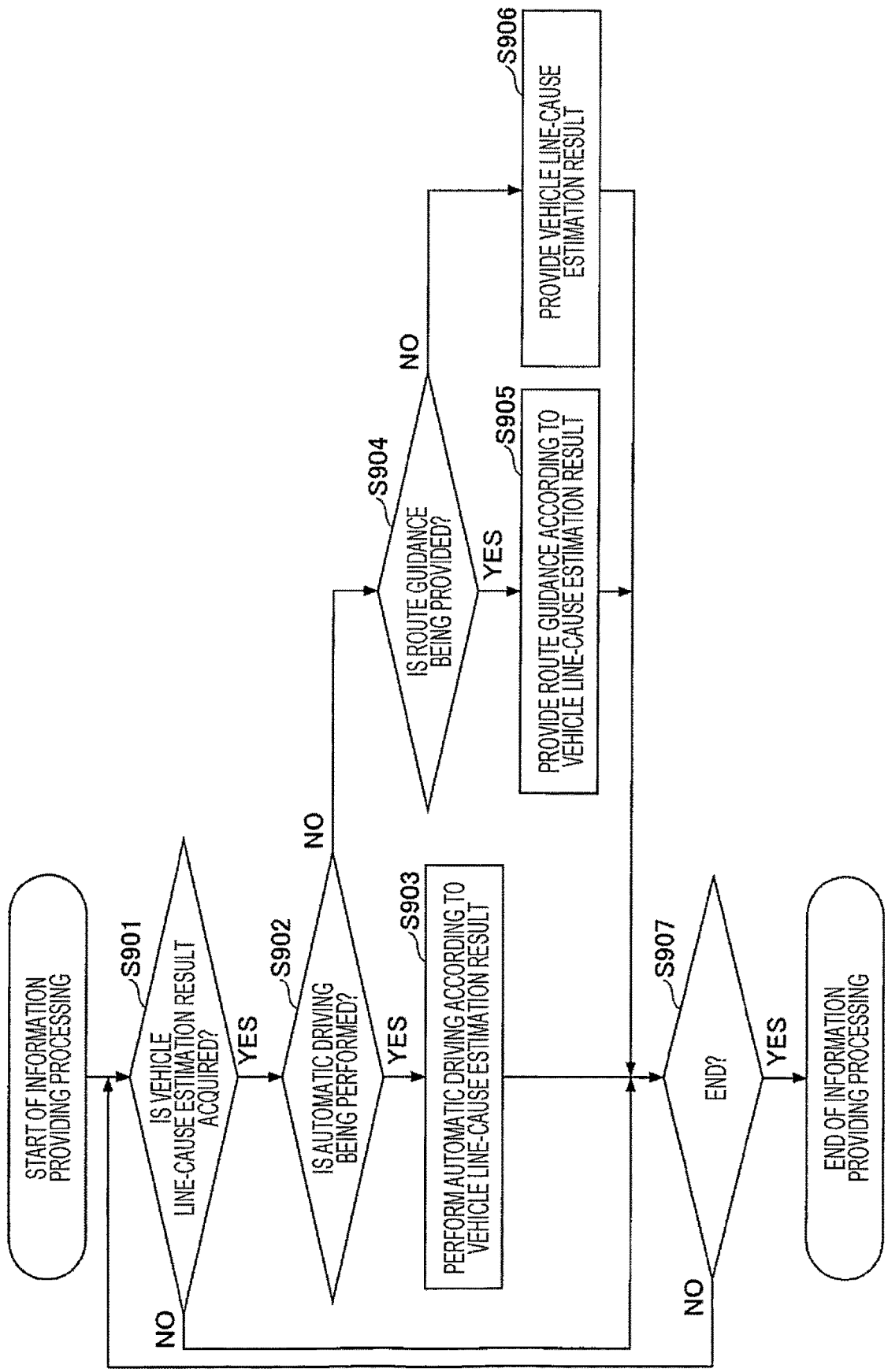
FIG. 9 is a flowchart illustrating a flow of information providing processing.

Next, a flow of information providing processing by the information providing device 150 of the in-vehicle system 120_n of the target vehicle will be described. FIG. 9 is a flowchart illustrating the flow of the information providing processing.

In step S901, the vehicle line-cause acquisition unit 801 of the information providing device 150 determines whether the estimation result of the cause of the vehicle has been acquired from the vehicle line-cause estimation apparatus 110. If it is determined in step S801 that the estimation result of the cause of the vehicle line has not been acquired (NO in step S901), the processing proceeds to step S907.

With respect to the above, if it is determined in step S901 that the estimation result of the cause of the vehicle line has been acquired (YES in step S901), the processing proceeds to step S902.

In step S902, the driving control unit 805 of the information providing device 150 determines whether the vehicle is in the automatic driving mode, and if it is determined that the vehicle is in the automatic driving mode (YES in step S902), the processing proceeds to step S903.

In step S903, the driving control unit 805 of the information providing device 150 provides the estimation result of the cause of the vehicle line (or the instruction according to the estimation result) to the automatic driving function. As a result, in the automatic driving function, it is possible to perform an appropriate driving operation (automatic driving) according to the estimation result of the cause of the vehicle line.

With respect to the above, if it is determined in step S902 that the vehicle is not in the automatic driving mode (NO in step S902), the processing proceeds to step S904.

In step S904, the guidance unit 804 of the information providing device 150 determines whether route guidance by the navigation device is being provided. If it is determined in step S904 that route guidance by the navigation device is being provided (YES in step S904), the processing proceeds to step S905.

In step S905, the guidance unit 804 of the information providing device 150 provides the estimation result of the cause of the vehicle line (or the instruction according to the estimation result) to the navigation device. As a result, the navigation device can provide route guidance on the basis of the estimation result of the cause of the vehicle line (or the instruction according to the estimation result), and the driver of the target vehicle can perform an appropriate driving operation according to the cause of the vehicle line.

With respect to the above, if it is determined in step S904 that route guidance by the navigation device is not being provided (NO in step S904), the processing proceeds to step S906.

In step S906, the vehicle line-cause notification unit 803 of the information providing device 150 provides the estimation result of the cause of the vehicle line (or the instruction according to the estimation result) to an occupant. As a result, the driver of the target vehicle can perform an appropriate driving operation according to the estimation result of the cause of the vehicle line.

In step S907, the vehicle line-cause acquisition unit 801 of the information providing device 150 determines whether to end the information providing processing. If it is determined in step S907 to continue the information providing processing (NO in step S907), the processing returns to step S901.

With respect to the above, if it is determined in step S907 to end the information providing processing, the information providing processing is ended.

SUMMARY

As is clear from the above description, the vehicle line-cause estimation apparatus 110:
- in a case where the occurrence of the vehicle line is detected in the vicinity of the target vehicle, communicates with each vehicle at the occurrence position and in the periphery thereof to acquire the position information and the video information from each vehicle;
- on the basis of the position information on each vehicle, the attribute of each vehicle determined on the basis the position information, and the video information on each vehicle, searches for the feature data and the structure data related to the vehicle line; and
- estimates the cause of the vehicle line in the traveling direction of the target vehicle on the basis of the searched feature data and structure data, and transmits the estimation result to the target vehicle.

As a result, it is possible to estimate the cause of the vehicle line.

Additionally, the information providing device 150 of the target vehicle:
- acquires the estimation result of the cause of the vehicle line in the traveling direction of the target vehicle, which is estimated on the basis of the position information and the video information acquired by vehicles other than the target vehicle; and
- instructs which lane the target vehicle should travel according to the acquired estimation result of the cause of the vehicle line.

As a result, the target vehicle can perform an appropriate driving operation at the time of the occurrence of the vehicle line.

Second Embodiment

In the first embodiment, the case illustrated in FIG. 2 has been exemplified as an application example of the information providing system 100. However, the application example of the information providing system 100 is not limited thereto, and the information providing system 100 may be applied to other cases. Hereinafter, in a second embodiment, another case to which the information providing system 100 can be applied will be exemplified.

<Application Example 1 of Information Providing System>

Figure 10:
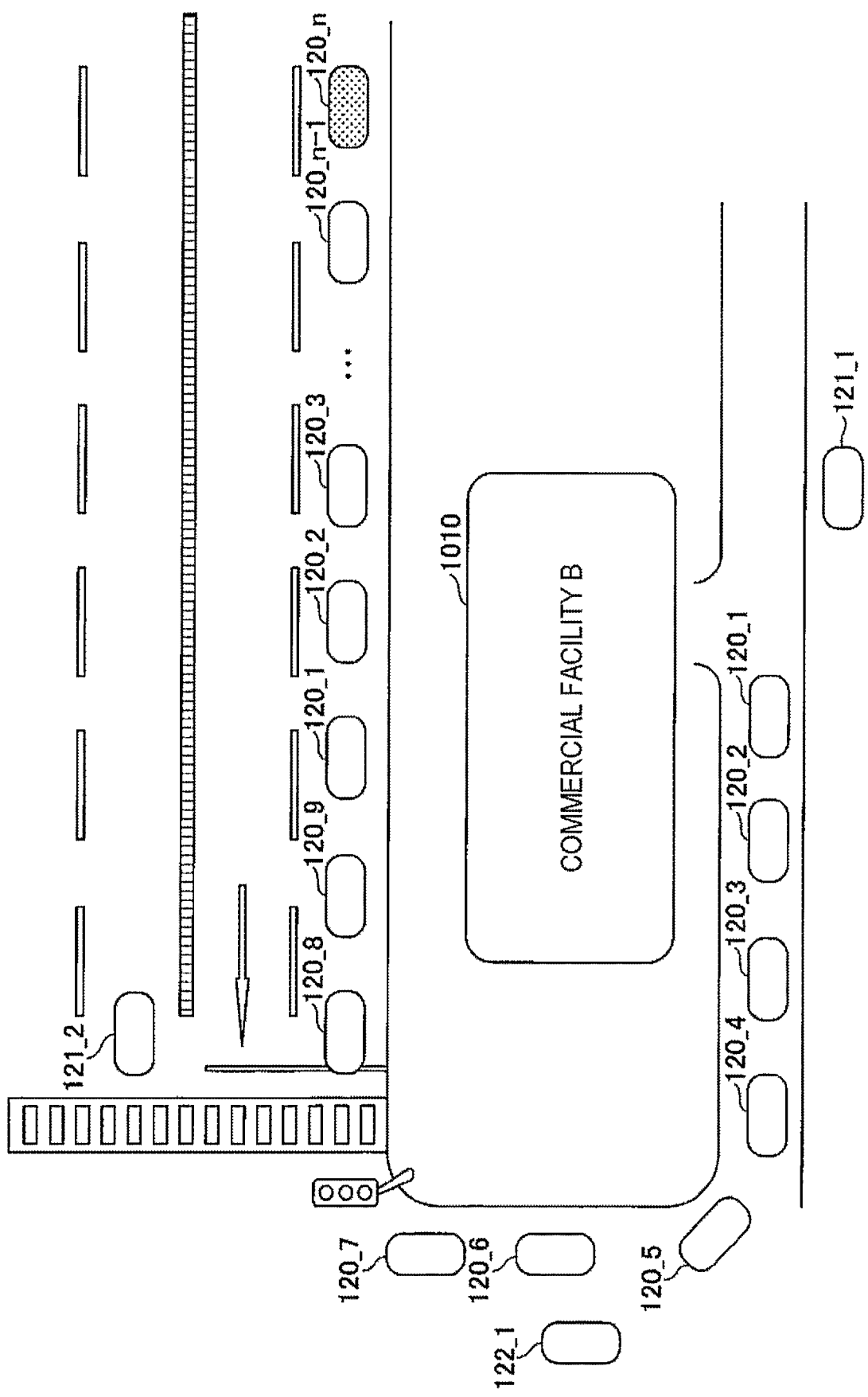
FIG. 10 is a first diagram illustrating another application example to which the information providing system can be applied.

First, Application Example 1 to which the information providing system 100 can be applied will be described. FIG. 10 is a first diagram illustrating another application example to which the information providing system can be applied. The example of FIG. 10 illustrates a situation where
- there is a facility 1010 (a "commercial facility B") along a two-lane road;
- an entrance of a parking lot of the facility 1010 faces a road opposite to the two-lane road;
- a traffic light is installed ahead of the facility 1010;
- of the two-lane road, the left lane has a vehicle line continuous with a vehicle line on a road after the left turn;
- the road after the left turn has the vehicle line continuous with a vehicle line on a road after a further left turn;
- the entrance of the parking lot of the facility 1010 faces the road after the further left turn; and
- a line of vehicles waiting for entry into the parking lot has occurred from the vicinity of the entrance of the parking lot of the facility 1010.

In such a road situation, it is assumed that the target vehicle on which the in-vehicle system 120_n is mounted is lined up at the end of the vehicle line to turn left at the traffic light and head for the destination. In such a case, in the information providing system 100, the vehicle line-cause estimation apparatus 110 estimates that the cause of the vehicle line in the traveling direction of the target vehicle is waiting for entry into the parking lot of the facility 1010 on the basis of the position information and the video information acquired from
- the in-vehicle system 120_1 of the head-of-vehicle-line vehicle;
- the in-vehicle system 120_2 of the near-head-of-vehicle-line vehicle;
- the in-vehicle systems 121_1 and 121_2 of the oncoming vehicles; and
- the in-vehicle system 122_1 of the observation vehicle, and transmits the estimation result to the in-vehicle system 120_n of the target vehicle.

As a result, for example, the driver of the target vehicle determines that there is no vehicle line ahead in the adjacent lane, and changes to the adjacent right lane. Additionally, the driver of the target vehicle goes straight after turning left at the intersection where the traffic light is located.

As described above, according to the information providing system 100, it is possible to acquire information in a wider range and estimate the cause of the vehicle line, and thus, it is possible to perform an appropriate driving operation when a vehicle line occurs.

<Application Example 2 of Information Providing System>

Figure 11:
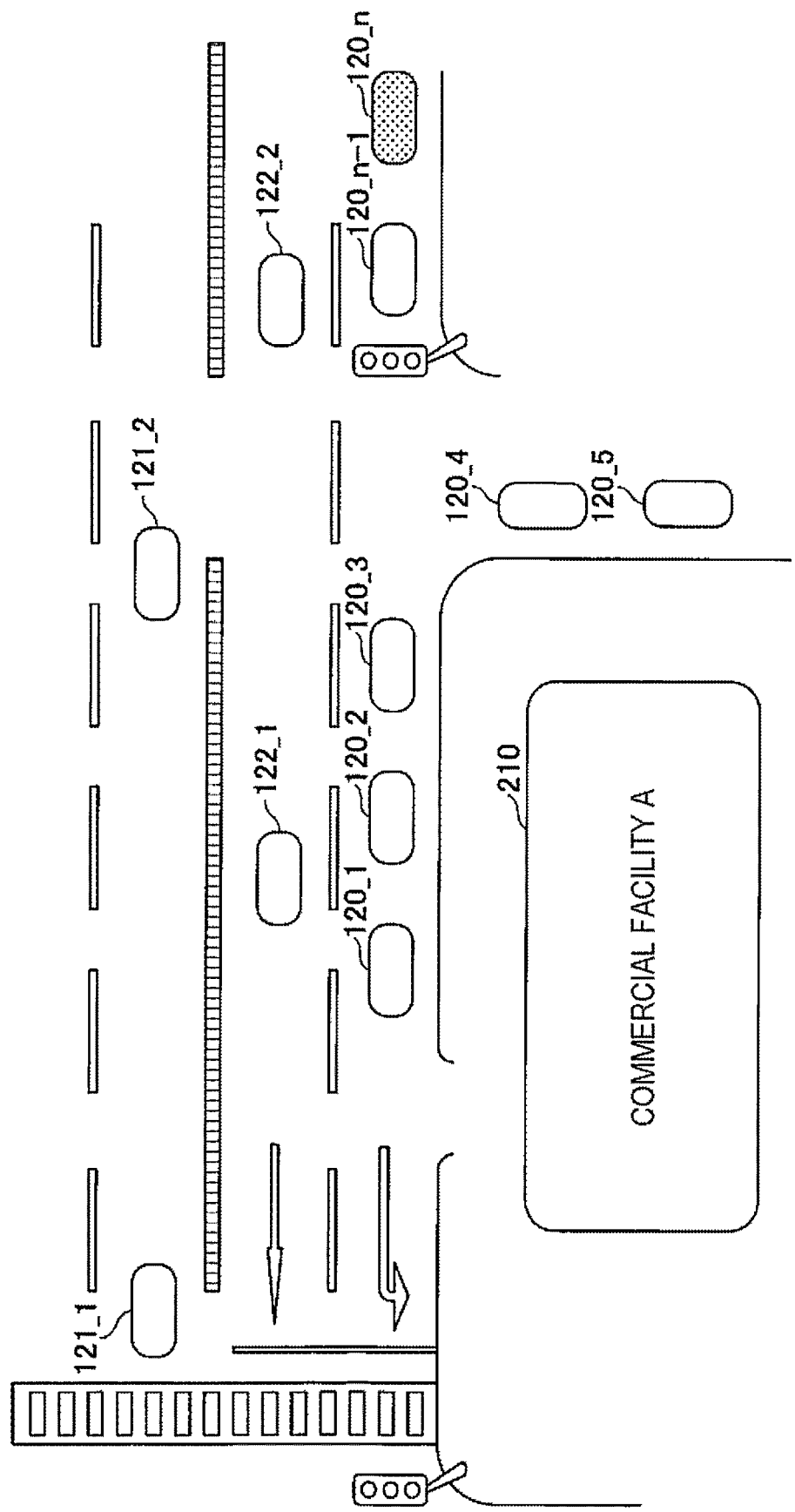
FIG. 11 is a second diagram illustrating another application example to which the information providing system can be applied.

Next, Application Example 2 to which the information providing system 100 can be applied will be described. FIG. 11 is a second diagram illustrating another application example to which the information providing system can be applied. The example of FIG. 11 illustrates a situation where
- there is the facility 210 ("the commercial facility A") along a two-lane road;
- the entrance of the parking lot of the facility 210 faces the two-lane road;
- a first traffic light is installed ahead of the entrance of the parking lot of the facility 210;
- the left lane of the two-lane road is designated as a left-turn lane before the first traffic light;
- in the left lane of the two-lane road, a line of vehicles waiting for entry into the parking lot has occurred from the vicinity of the entrance of the parking lot of the facility 210;
- there is a T-junction in the middle of the line of vehicles waiting for entry into the parking lot, a vehicle line is also continuous on the side of a road merging into the two-lane road, and a vehicle line is also continuous on the side of the two-lane road; and
- on the two-lane road, a second traffic light is installed before the position where the T-junction merges.

In such a road situation, it is assumed that the target vehicle on which the in-vehicle system 120_n is mounted is lined up at the end of the vehicle line to turn left at the first traffic light and head for the destination. In such a case, in the information providing system 100, the vehicle line-cause estimation apparatus 110 estimates that the cause of the vehicle line in the traveling direction of the target vehicle is not the second traffic light but rather is the wait line for entering the parking lot of the facility 210 on the basis of the position information and the video information acquired from the in-vehicle systems 120_1, 120n_1, and 120_4 of the head-of-vehicle-line vehicles;

the in-vehicle systems 120_2, 120n, and 120_5 of the near-head-of-vehicle-line vehicles;

the in-vehicle systems 121_1 and 121_2 of the oncoming vehicles; and the in-vehicle systems 122_1 and 122_2 of the observation vehicles, and transmits the estimation result to the in-vehicle system 120_n of the target vehicle.

As a result, for example, the driver of the target vehicle determines that there is no vehicle line ahead in the adjacent lane, and changes to the adjacent right lane. After passing through the second traffic light and the vicinity of the entrance of the parking lot of the facility 210, the driver of the target vehicle changes to the left lane and turns left at the intersection where the traffic light is located.

As described above, according to the information providing system 100, it is possible to acquire information in a wider range and estimate the cause of the vehicle line, and thus, it is possible to perform an appropriate driving operation when a vehicle line occurs.

<Application Example 3 of Information Providing System>

Figure 12:
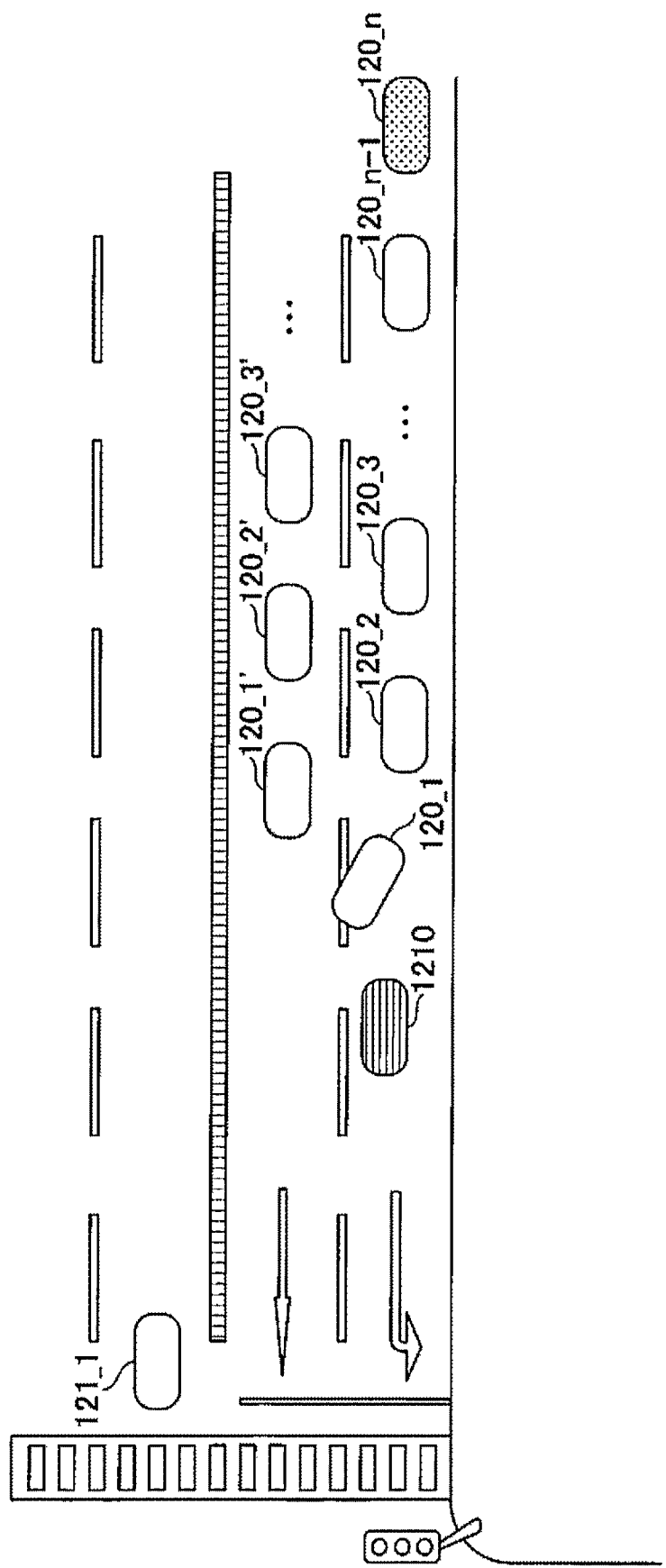
FIG. 12 is a third diagram illustrating another application example to which the information providing system can be applied.

Next, Application Example 3 to which the information providing system 100 can be applied will be described. FIG. 12 is a third diagram illustrating another application example to which the information providing system can be applied. The example of FIG. 12 illustrates a situation where an accident vehicle 1210 is stopped on a two-lane road;

a traffic light is installed ahead of the accident vehicle 1210;

the left lane of the two-lane road is designated as a left-turn lane before the traffic light; and vehicles traveling in the left lane of the two-lane road and vehicles traveling on the right side of the two-lane road alternately pass the accident vehicle 1210 from the right lane.

In such a road situation, it is assumed that the target vehicle on which the in-vehicle system 120_n is mounted is lined up at the end of the vehicle line to turn left at the traffic light and head for the destination. In such a case, in the information providing system 100, the vehicle line-cause estimation apparatus 110 estimates that the cause of the vehicle line in the traveling direction of the target vehicle is the accident vehicle on the basis of the position information and the video information acquired from the in-vehicle systems 120_1 and 120_1' of the head-of-vehicle-line vehicles;

the in-vehicle systems 120_2 and 120_2' of the near-head-of-vehicle-line vehicles; and the in-vehicle system 121_1 of the oncoming vehicle, and transmits the estimation result to the in-vehicle system 120_n of the target vehicle.

In this case, for example, the driver of the target vehicle determines that there is a vehicle line ahead in the adjacent lane, and travels at the tail end of the vehicle line without changing lanes. Additionally, the driver of the target vehicle changes to the right lane before the accident vehicle 1210 to avoid the accident vehicle 1210, then changes to the left lane again, and turns left at the intersection where the traffic light is located.

As described above, according to the information providing system 100, it is possible to acquire information in a wider range and estimate the cause of the vehicle line, and thus, it is possible to perform an appropriate driving operation when a vehicle line occurs.

SUMMARY

As is clear from the above description, the information providing device 150 of the target vehicle provides the estimation result of the cause of the vehicle line in various scenarios where the vehicle line occurs. As a result, the driver of the target vehicle can perform an appropriate driving operation according to the estimation result of the cause of the vehicle line.

Note that while each of the above application examples describes the case of providing the estimation result, as in the first embodiment, an instruction according to the estimation result may be provided instead. Additionally, while each of the above application examples describes the case where the estimation result is provided to the occupant of the target vehicle, as in the first embodiment, the estimation result may be provided to the navigation device or the automatic driving function.

Other Embodiments

In the first and second embodiments, it has been described that vehicle line-cause estimation apparatus 110 transmits the estimation result of the cause of the vehicle line to the in-vehicle system 120_n of the target vehicle. However, the estimation result of the cause of the vehicle line is not necessarily transmitted to the in-vehicle system 120_n of the target vehicle. For example, the estimation result may be transmitted to a server device or a server system of a service that provides vehicle line information or a service that provides map information. Alternatively, instead of the estimation result of the cause of the vehicle line, the vehicle line-cause estimation apparatus 110 may transmit the position information and the video information used for estimating the cause of the vehicle line to the server device and the server system.

Additionally, in the first and second embodiments, the description has been given on the assumption that the vehicle line-cause estimation apparatus 110 acquires the position information and the video information of vehicles other than the target vehicle and estimates the cause of the vehicle line. However, the target vehicle may acquire the position information and the video information of vehicles other than the target vehicle and estimate the cause of the vehicle line. Alternatively, some of the functions (the vehicle line detection unit 410, the position information acquisition unit 411, the video information acquisition unit 412, the vehicle identification unit 413, the feature search unit 414, structure search unit 415, and the vehicle line-cause estimation unit 416) implemented by the vehicle line-cause estimation apparatus 110 may be implemented in the target vehicle.

Additionally, while the first and second embodiments have been described on the assumption that the vehicle line that has occurred in the vicinity of the target vehicle is detected, a vehicle line that has occurred in a position away from the target vehicle may be detected.

Additionally, the first and second embodiments have been described on the assumption that the cause of the vehicle line is estimated using sensor information directly sensed by, for example, the video information recording device and the sensor information recording device. However, the method of estimating the cause of the vehicle line is not limited thereto, and the cause of the vehicle line may be estimated using non-sensor information different from the directly sensed sensor information.

As one example, a case will be described in which a chronic vehicle line occurs due to a nearby facility (in particular, a facility not captured by the in-vehicle video information recording device). In such a case, it is not possible to estimate the cause of the vehicle line on the basis of the video information.

As a countermeasure, for example, in a mesh obtained by dividing the real space into predetermined ranges, a chronic traffic congestion may be estimated using information on the number of automobiles calculated in a predetermined time unit or the like. Alternatively, a facility that causes a vehicle line may be registered in advance, and when a vehicle line whose cause cannot be estimated occurs, the registered facility present in the same mesh or neighboring mesh may be estimated as the cause of the vehicle line.

In this way, by using non-sensor information, it is possible to estimate the cause of a vehicle line with an unknown cause.

Note that the present invention is not limited to the configuration described herein, such as the configuration described in the above embodiment, a combination with other elements, and the like. These points can be changed without departing from the gist of the present invention, and can be appropriately determined according to the application.

REFERENCE SIGNS LIST 100 information providing system
110 vehicle line-cause estimation apparatus
120_1 to 120_n in-vehicle system
121_1, 122_1 in-vehicle system
130_1 to 130_n position information acquisition device
131_1, 132_1 position information acquisition device
140_1 to 140_n video information acquisition device
141_1, 142_1 video information acquisition device
150 information providing device
410 vehicle line detection unit
411 position information acquisition unit
412 video information acquisition unit
413 vehicle identification unit
414 feature search unit
415 structure search unit
416 vehicle line-cause estimation unit
801 vehicle line-cause acquisition unit
802 determination unit
803 vehicle line-cause notification unit
804 guidance unit
805 driving control unit

The invention claimed is:

1. An estimation method comprising:
acquiring sensor information acquired by a sensor mounted on a first vehicle that is a vehicle belonging to a vehicle line or sensor information acquired by a sensor mounted on a second vehicle;
acquiring position information on a location of the first vehicle from which the sensor information is acquired;
estimating a cause of the vehicle line by using the sensor information and the position information, and
controlling a device including a processor to perform an operation related to driving of a target vehicle, based on the estimated cause, wherein
the estimating of the cause includes estimating the cause by using information on a facility or a feature present near the first vehicle, information indicating a state of the first vehicle, information on an object present ahead of the first vehicle included in the sensor information, or information on a road that affects traveling, the information on the facility or the feature being searched based on the position information, the information on the object being estimated based on the sensor information, and the information on the road being searched based on the position information.

2. The estimation method according to claim 1, wherein the estimating of the cause includes estimating the state of the first vehicle based on the sensor information, and estimating that the first vehicle is the cause of the vehicle line in response to determining that the first vehicle is traveling at a speed lower than a value predetermined relative to a speed of the second vehicle.

3. The estimation method according to claim 2 further comprising acquiring non-sensor information different from directly sensed sensor information, wherein
the estimating of the cause includes estimating the cause of the vehicle line by using the non-sensor information when a vehicle line, including on-road parking of a transport vehicle, whose cause is not estimable from the sensor information.

4. The estimation method according to claim 1, wherein the estimating of the cause includes estimating that a facility, among facilities present near the first vehicle that are searched based on the position information, is the cause of the vehicle line, the facility being within a predetermined distance from a position where the first vehicle is located and being adjacent to a road on which the first vehicle travels.

5. The estimation method according to claim 1, wherein the estimating of the cause includes estimating that a feature, among features present near the first vehicle that are searched based on the position information, is the cause of the vehicle line, the feature being within a predetermined distance from a position where the first vehicle is located and being present on a road on which the first vehicle travels.

6. The estimation method according to claim 1, wherein the estimating of the cause includes estimating that an object, among objects present ahead of the first vehicle that are included in the sensor information, is the cause of the vehicle line, the object being not present in normal times of a road on which the first vehicle travels.

7. The estimation method according to claim 1, wherein the device includes at least one of a navigation device or an automatic driving vehicle.

8. The estimation method according to claim 1, wherein the device provides route guidance based on the estimated cause.

9. The estimation method according to claim 1, wherein the device displays a driving route based on the estimated cause.

10. The estimation method according to claim 1, wherein the device performs an automatic driving operation based on the estimated cause.

11. The estimation method according to claim 1, further comprising:
acquiring position information on a location of the second vehicle; and
determining vehicle attribute information based on the position information on the location of the first vehicle and the position information on the location of the second vehicle, the vehicle attribute information indicating whether the first vehicle belongs to the vehicle line and indicating whether the second vehicle belongs to the vehicle line, wherein
the sensor information is acquired by the sensor mounted on the first vehicle and the sensor information is acquired by the sensor mounted on the second vehicle that does not belong to the vehicle line, and
the cause of the vehicle line is estimated by using the sensor information, the position information, and the vehicle attribute information.

12. An estimation apparatus comprising:
a processor; and
a memory storing program instructions that cause the processor to:
acquire sensor information acquired by a sensor mounted on a first vehicle that is a vehicle belonging to a vehicle line or sensor information acquired by a sensor mounted on a second vehicle;
acquire position information on a location of the first vehicle from which the sensor information is acquired;
estimate a cause of the vehicle line by using the sensor information and the position information, and
controlling a device including a processor to perform an operation related to driving of a target vehicle, based on the estimated cause, wherein
the program instructions cause the processor to estimate the cause by using information on a facility or a feature present near the first vehicle, information indicating a state of the first vehicle, information on an object present ahead of the first vehicle included in the sensor information, or information on a road that affects traveling, the information on the facility or the feature being searched based on the position information, the information on the object being estimated based on the sensor information, and the information on the road being searched based on the position information.

13. A non-transitory computer-readable recording medium having stored therein an estimation program for causing a computer to execute an estimation method comprising:
acquiring sensor information acquired by a sensor mounted on a first vehicle that is a vehicle belonging to a vehicle line or sensor information acquired by a sensor mounted on a second vehicle;
acquiring position information on a location of the first vehicle from which the sensor information is acquired;
estimating a cause of the vehicle line by using the sensor information and the position information, and
controlling a device including a processor to perform an operation related to driving of a target vehicle, based on the estimated cause, wherein
the estimating of the cause includes estimating the cause by using information on a facility or a feature present near the first vehicle, information indicating a state of the first vehicle, information on an object present ahead of the first vehicle included in the sensor information, or information on a road that affects traveling, the information on the facility or the feature being searched based on the position information, the information on the object being estimated based on the sensor information, and the information on the road being searched based on the position information.

* * * * *